US009819723B2

United States Patent
Han

(10) Patent No.: US 9,819,723 B2
(45) Date of Patent: Nov. 14, 2017

(54) METHOD AND APPARATUS FOR SHARING INFORMATION

(71) Applicant: TENCENT TECHNOLOGY (SHENZHEN) COMPANY LIMITED, Shenzhen (CN)

(72) Inventor: Zixin Han, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 256 days.

(21) Appl. No.: 14/689,078

(22) Filed: Apr. 17, 2015

(65) Prior Publication Data
US 2015/0222690 A1 Aug. 6, 2015

Related U.S. Application Data

(63) Continuation of application No. PCT/CN2013/084557, filed on Sep. 29, 2013.

(30) Foreign Application Priority Data

Oct. 18, 2012 (CN) .......................... 2012 1 0397347

(51) Int. Cl.
G06F 15/16 (2006.01)
H04L 29/08 (2006.01)
(Continued)

(52) U.S. Cl.
CPC .............. *H04L 67/02* (2013.01); *H04L 67/26* (2013.01); *H04W 4/005* (2013.01); *H04W 4/008* (2013.01); *H04W 4/206* (2013.01)

(58) Field of Classification Search
CPC . H04W 4/008; H04W 4/005; H04W 36/0011; H04L 67/02; H04L 67/26
(Continued)

(56) References Cited

U.S. PATENT DOCUMENTS

2010/0214604 A1* 8/2010 Hosono .............. G03G 15/5066
358/1.15
2012/0179754 A1 7/2012 Nilsson et al.
(Continued)

FOREIGN PATENT DOCUMENTS

CN 101465674 A 6/2009
CN 102340540 A 2/2012
(Continued)

OTHER PUBLICATIONS

Chinese Office Action for Application No. 2012103973475 dated Sep. 9, 2016, and an English concise explanation of relevance thereof.
(Continued)

*Primary Examiner* — Backhean Tiv
*Assistant Examiner* — Weiwei Stiltner
(74) *Attorney, Agent, or Firm* — Harness, Dickey & Pierce, P.L.C.

(57) ABSTRACT

A method and apparatus for sharing information are described. The method includes obtaining, by a first UE, a web page address from a browser of the first UE. Information including the web page address is sent by the first UE to a second UE via a NFC device of the first UE. The information including the web page address from the first UE is received by the second UE via a NFC device of the second UE. The method further includes triggering, by the second UE, a browser of the second UE to open a web page corresponding to the web page address.

12 Claims, 6 Drawing Sheets

(51) Int. Cl.
*H04W 4/00* (2009.01)
*H04W 4/20* (2009.01)

(58) Field of Classification Search
USPC .......................................................... 709/201
See application file for complete search history.

(56) References Cited

U.S. PATENT DOCUMENTS

2012/0258663 A1    10/2012  Teruyama et al.
2014/0096202 A1*   4/2014   Matsuda ............... H04W 4/008
                                                 726/4

FOREIGN PATENT DOCUMENTS

CN          102394866 A      3/2012
CN          202475420 U     10/2012

OTHER PUBLICATIONS

International Preliminary Report for Application No. PCT/CN2013/084557, dated Apr. 30, 2015.
International Search Report for Application No. PCT/CN2013/084557 dated Jan. 2, 2014.

* cited by examiner

METHOD AND APPARATUS FOR SHARING INFORMATION

CROSS-REFERENCE TO RELATED APPLICATIONS

This application is a continuation of International Application No. PCT/CN2013/084557 filed on Sep. 29, 2013. This application claims the benefit and priority of Chinese Application No. 201210397347.5 filed Oct. 18, 2012. The entire disclosures of each of the above applications are incorporated herein by reference.

FIELD

The present disclosure relates to a method and apparatus for sharing information.

BACKGROUND

This section provides background information related to the present disclosure which is not necessarily prior art.

Currently, with the developments of communication technologies, Near Field Communication (NFC) devices are integrated into many types of user equipment (UE), e.g. mobile terminals. The NFC device communicates with other devices close to the NFC device by using NFC technologies.

In addition, the traditional UE, e.g. the mobile terminal is generally installed with a browser. After a user accesses the Internet by using the browser of the UE, the user may need to share a web page with another person. In the procedure of sharing the web page, the user tells the person a web page address, which is also called Uniform/Universal Resource Locator (URL). The person inputs the web page address into a browser of a UE and the person then browses the web page via the browser.

Generally, the web page address is always verbose and it is time-consuming and laborious for the user to input the web page address into the browser of the UE. The user has to spend more than ten seconds or tens of seconds to share the web page, and when the web page address is longer, the user will spend more time sharing the web page, and there is a risk for error. Therefore, the efficiency of sharing the web page is very low.

SUMMARY

This section provides a general summary of the disclosure, and is not a comprehensive disclosure of its full scope or all of its features.

Various embodiments provide a method and apparatus for sharing information so that it is convenient for a user to share a web page with another person or obtain a web page shared by another person, thereby simplifying web page sharing operations and sharing the web page efficiently.

A method for sharing information includes:
obtaining, by a first UE, a web page address from a browser of the first UE;
sending, by the first UE, information comprising the web page address to a second UE via a NFC device of the first UE;
receiving, by the second UE, the information comprising the web page address from the first UE via a NFC device of the second UE; and
triggering, by the second UE, a browser of the second UE to open a web page corresponding to the web page address.

An apparatus for sharing information includes:

a receiving-sending module to receive information comprising a web page address from a communication object via a NFC device of a UE;
a triggering module to trigger a browser of the UE to open a web page corresponding to the web page address, after the NFC device receives the information;
the web page address being obtained by the communication object from a browser corresponding to the communication object and the information comprising the web page address being sent by the communication object via a NFC device corresponding to the communication object.

An apparatus for sharing information includes:
a web page address obtaining module, to obtain a web page address from a browser of a UE;
a receiving-sending module to send information comprising the web page address to a communication object via a NFC device of the UE;
the information being received by the communication object via a NFC device corresponding to the communication object and the web page address being used by the communication object to trigger a browser corresponding to the communication object to open a web page corresponding to the web page address.

According to various embodiments, the web page address is obtained from the browser and sent to the communication object via the NFC device of the UE or the web page address is obtained from the communication object via the NFC device of the UE and the web page corresponding to the web page address is opened by the browser, thereby simplifying web page sharing operations and sharing the web page efficiently.

According to various embodiments, regardless of how long the web page address is, the sharing of the web page address is implemented instantaneously with less risk for error. Moreover, the present disclosure avoids the cumbersome processes for sharing information and renders information sharing more casual and efficient. Further, the user does not need to perform operations step by step to make two devices open in the same web page, but only needs to make the UE gently touch another device, thereby greatly simplifying the operation of sharing information.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A, 1B, and 1C are diagrams illustrating a mode for sharing information according to various embodiments.

Corresponding reference numerals indicate corresponding parts throughout the several views of the drawings.

DETAILED DESCRIPTION

Figure 1A:
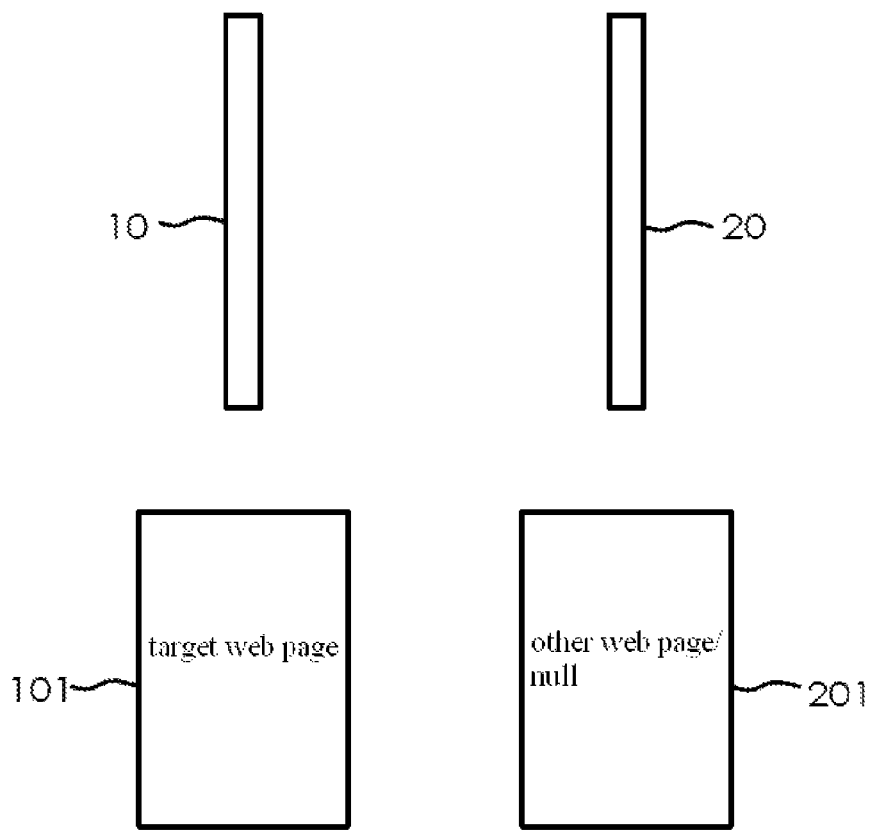

Example embodiments will now be described more fully with reference to the accompanying drawings.

The following description is merely illustrative in nature and is in no way intended to limit the disclosure, its application, or uses. The broad teachings of the disclosure can be implemented in a variety of forms. Therefore, while this disclosure includes particular embodiments, the true scope of the disclosure should not be so limited since other modifications will become apparent upon a study of the drawings, the specification, and the following claims. For purposes of clarity, the same reference numbers will be used in the drawings to identify similar elements.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of embodiments anywhere in this specification, including embodiments of any terms discussed herein, is illustrative only, and in no way limits the scope and meaning of the disclosure or of any exemplified term. Likewise, the disclosure is not limited to various embodiments given in this specification.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules may be executed using a single (shared) processor. In addition, some or all code from multiple modules may be stored by a single (shared) memory. The term "group", as used herein, means that some or all code from a single module may be executed using a group of processors. In addition, some or all code from a single module may be stored using a group of memories.

The systems and methods described herein may be implemented by one or more computer programs executed by one or more processors. The computer programs include processor-executable instructions that are stored on a non-transitory tangible computer readable medium. The computer programs may also include stored data. Non-limiting embodiments of the non-transitory tangible computer readable medium are nonvolatile memory, magnetic storage, and optical storage.

The description will be made as to the various embodiments in conjunction with the accompanying drawings in FIGS. 1-4. It should be understood that specific embodiments described herein are merely intended to explain the present disclosure, but not intended to limit the present disclosure. In accordance with the purposes of this disclosure, as embodied and broadly described herein, this disclosure, in one aspect, relates to method and apparatus for sharing information.

Embodiments of UEs that can be used in accordance with various embodiments include, but are not limited to, a tablet PC (including, but not limited to, Apple iPad and other touch-screen devices running Apple iOS, Microsoft Surface and other touch-screen devices running the Windows operating system, and tablet devices running the Android operating system), a mobile phone, a smartphone (including, but not limited to, an Apple iPhone, a Windows Phone and other smartphones running Windows Mobile or Pocket PC operating systems, and smartphones running the Android operating system, the Blackberry operating system, or the Symbian operating system), an e-reader (including, but not limited to, Amazon Kindle and Barnes & Noble Nook), a laptop computer (including, but not limited to, computers running Apple Mac operating system, Windows operating system, Android operating system and/or Google Chrome operating system), or an on-vehicle device running any of the above-mentioned operating systems or any other operating systems, all of which are well known to one skilled in the art.

Figure 1B:
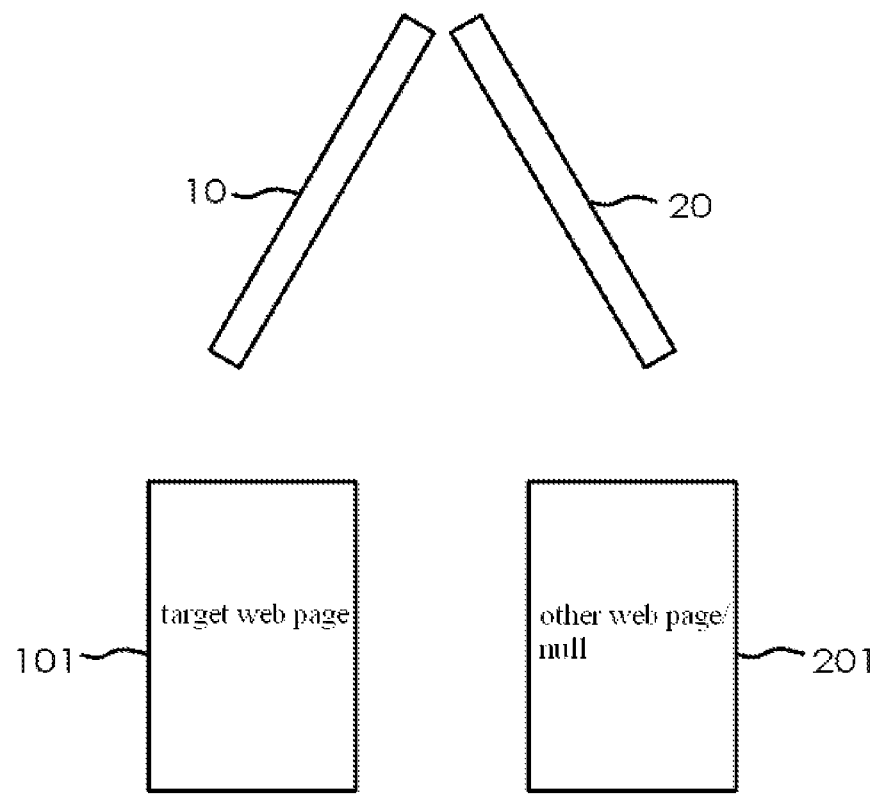

FIG. 1A, FIG. 1B, and FIG. C are diagrams illustrating a mode for sharing information according to various embodiments. In FIG. 1A, a web page opened on browser 101 of user equipment (UE) 10 is a target web page. A web page opened on browser 102 of communication device 20 is another web page, or no web page is opened on browser 102, or browser 102 is not started.

Figure 2:
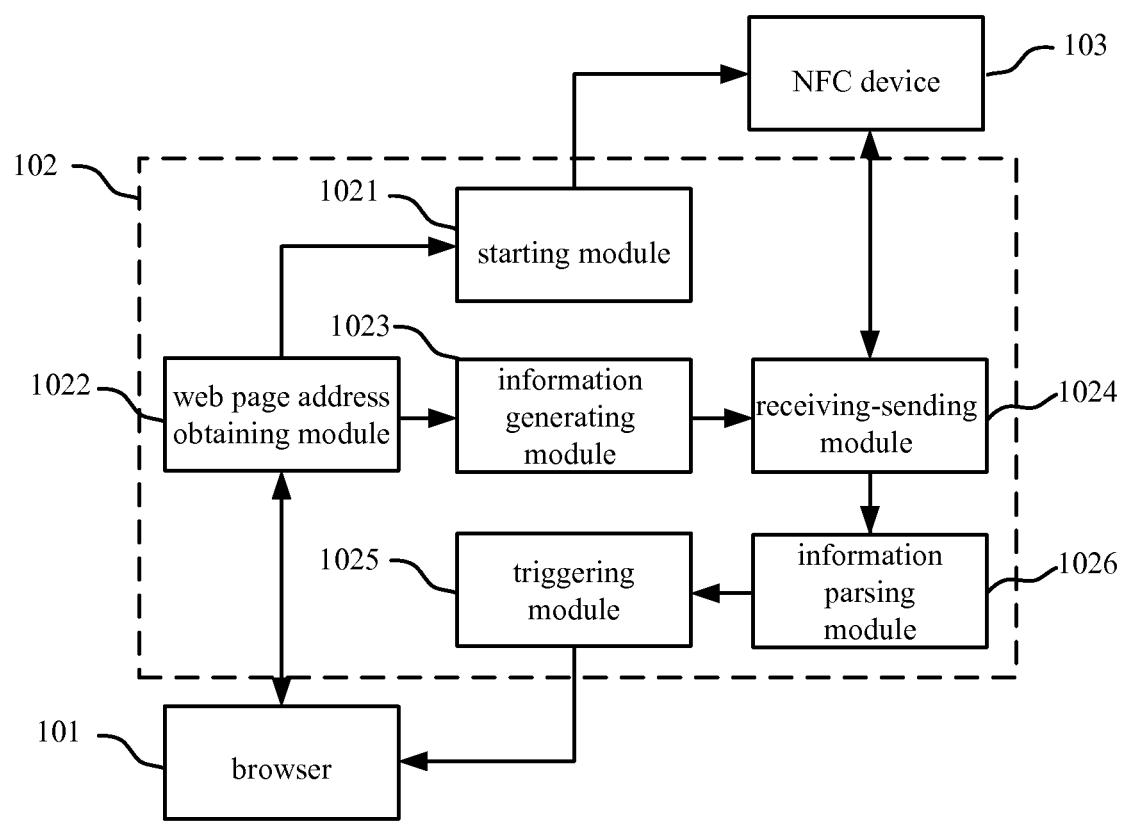
FIG. 2 is a diagram illustrating a structure of an apparatus for sharing information according to various embodiments.

As shown in FIG. 2, when needing to share the target web page with communication object 20, UE 10 gets close to communication object 20 and sends a web page address of the target web page to communication object 20. Communication object 20 receives the web page address of the target web page from UE 10. According to various embodiments, UE 10 sends the web page address of the target web page to communication object 20 via a NFC device of UE 10, and communication object 20 receives the web page address of the target web page from UE 10 via a NFC device of communication object 20.

Figure 1C:
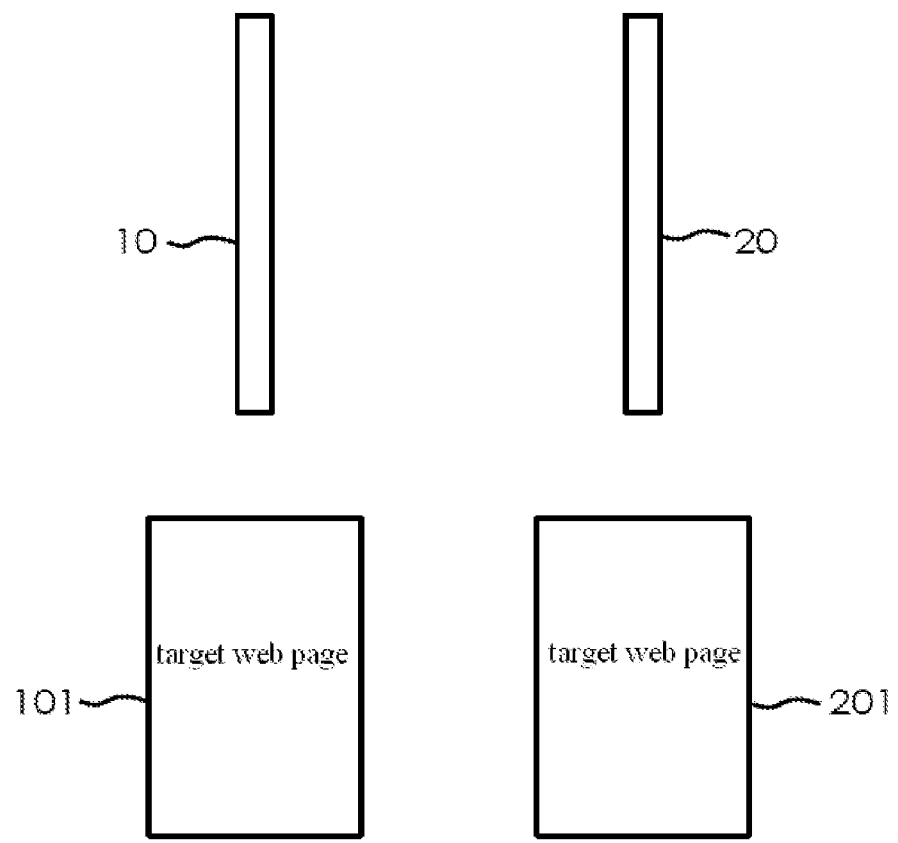
Figure 3:
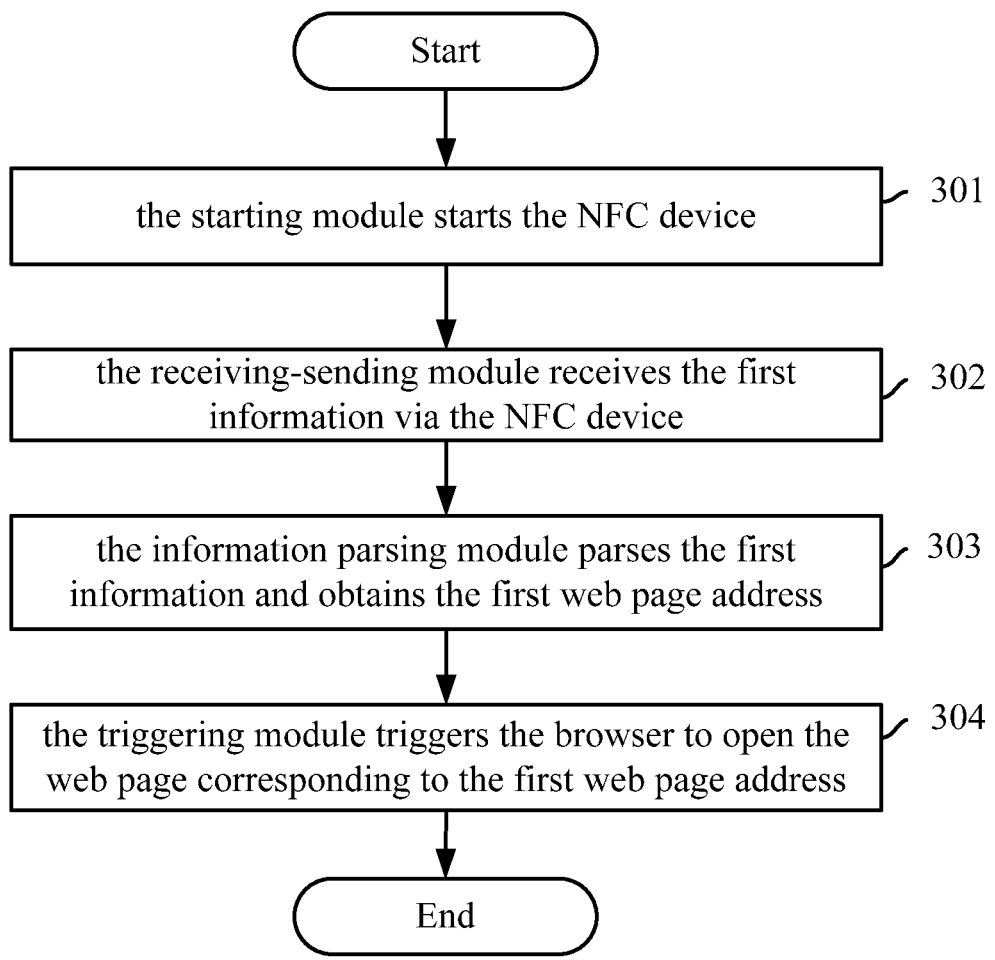
FIG. 3 is a flowchart illustrating a method for sharing information according to various embodiments.

As shown in FIG. 3, communication object 20 opens the target web page according to the web page address. In FIG. 1A, FIG. 1B, and FIG. 1C, UE 10 may receive a web page address sent by communication object 20, and may open a web page corresponding to the web page address sent by communication object 20.

According to various embodiments, in one case, UE 10 receives a first web page address from another device, e.g. a first communication object, so that UE 10 may open a web page shared by the first communication object. In the other case, UE 10 sends a second web page address to another device, e.g. a second communication object, so that the second communication object may open a web page shared by UE10.

FIG. 2 is a diagram illustrating a structure of an apparatus 102 for sharing information according to various embodiments. As shown in FIG. 2, the apparatus 102 includes a web page address obtaining module 1022, a receiving-sending module 1024, and a triggering module 1025. The web page address obtaining module 1022 is electrically connected to a browser 101 of UE 10, the receiving-sending module 1024 is electrically connected to a NFC device 103 of UE 10, and the triggering module 1025 is electrically connected to the browser 101 of UE 10.

In the first case, a starting module 1021 starts the NFC device 103 of UE 10 when needing to receive the first web page from the first communication object. Hence, the NFC device 103 may normally receive the first web page address from the first communication object. The receiving-sending module 1024 receives the first information including the first web page address from the first communication object via the NFC device 103 when needing to receive the first web page from the first communication object. Hence, the first web page address is shared and the sharing is implemented efficiently.

The triggering module 1025 triggers the browser 101 of UE 10 to open a web page corresponding to the first web page address when the NFC device 103 receives the first information including the first web page address. Hence, the sharing of the web page is implemented by the apparatus 102.

In the first case, the first web address is obtained by the first communication object from a browser corresponding to the first communication object, and the first information including the first web page address is sent by the first communication object via a NFC device corresponding to the first communication object.

According to various embodiments, the apparatus 102 may further include an information parsing module 1026. The information parsing module 1026 is electrically connected to the receiving-sending module 1024 and the triggering module 1025. The information parsing module 1026 parses the first information and obtains the first web page address after the NFC device 103 receives the first information.

In the second case, the web page address obtaining module 1022 obtains the second web page address from the browser 101 of UE 10. The web page address obtaining module 1022 may obtain the second web page address by accessing an address bar of the browser 101 and copy a web page address in the address bar.

The receiving-sending module 1024 sends the second information including the second web page address to the second communication object via the NFC device 103 of UE 10 when needing to send the second web page address to the second communication object. Hence, the second web page address is shared and the sharing is implemented efficiently.

In the second case, the second information is received by the second communication object via a NFC object corresponding to the second communication object, and the second web page address is a basis for triggering a browser corresponding to the second communication object to open the web page.

Moreover, according to various embodiments, the apparatus 102 may further include an information generating module 1023. The information generating module 1023 is electrically connected to the web page address obtaining module 1022 and the receiving-sending module 1024.

The information generating module 1023 generates the second information according to the second web page address when needing to send the second web page address to the second communication object. The second web page address is included in the second information. The second information may include other information, e.g. a title and encryption information corresponding to the second web page address, etc.

The apparatus 102 further includes a starting module 1021. The starting module 1021 is electrically connected to the web page address obtaining module 1022 and the NFC device 103. The starting module 1021 starts the NFC device 103 when needing to send the second information to the second communication object. When the NFC device 103 of UE 10 is needed, the NFC device 103 may be not in an active state. If the NFC device 103 of UE 10 is not in the active state, the receiving-sending module 1024 cannot send the second web page address to the second communication object via the NFC device 103. Hence, the using the starting module 1021 ensures that the NFC device 103 is usable when needing to send the second web page address to the second communication object.

FIG. 3 is a flowchart illustrating a method for sharing information according to various embodiments.

At 301, the starting module 1021 starts the NFC device 103 when the first information including the first web page address needs to be received from the first communication object. After the processing at 301 is performed, it is ensured that the receiving-sending module 1024 can normally receive the first information from the first communication object.

At 302, the receiving-sending module 1024 receives the first information from the first communication object via the NFC device 103, when the first information including the first web page address needs to be received from the first communication object. After the processing at 302 is performed, the first web page address is shared and the sharing is implemented efficiently. Specifically, the receiving-sending module 1024 receives the first information including the first information from the first communication object via the NFC device 103 when the first web page address needs to be received from the first communication object and the first information includes the first web page address.

At 303, the information parsing module 1026 parses the first information and obtains the first web page address after the NFC 103 receives the first information.

At 304, the triggering module 1025 triggers the browser 101 to open the web page corresponding to the first web page address. After the processing at 304 is performed, the sharing of the web page is implemented by the apparatus 102.

The first web address is obtained by the first communication object from the browser corresponding to the first communication object and the first information including the first web page address is sent by the first communication object via the NFC device corresponding to the first communication object.

Figure 4:
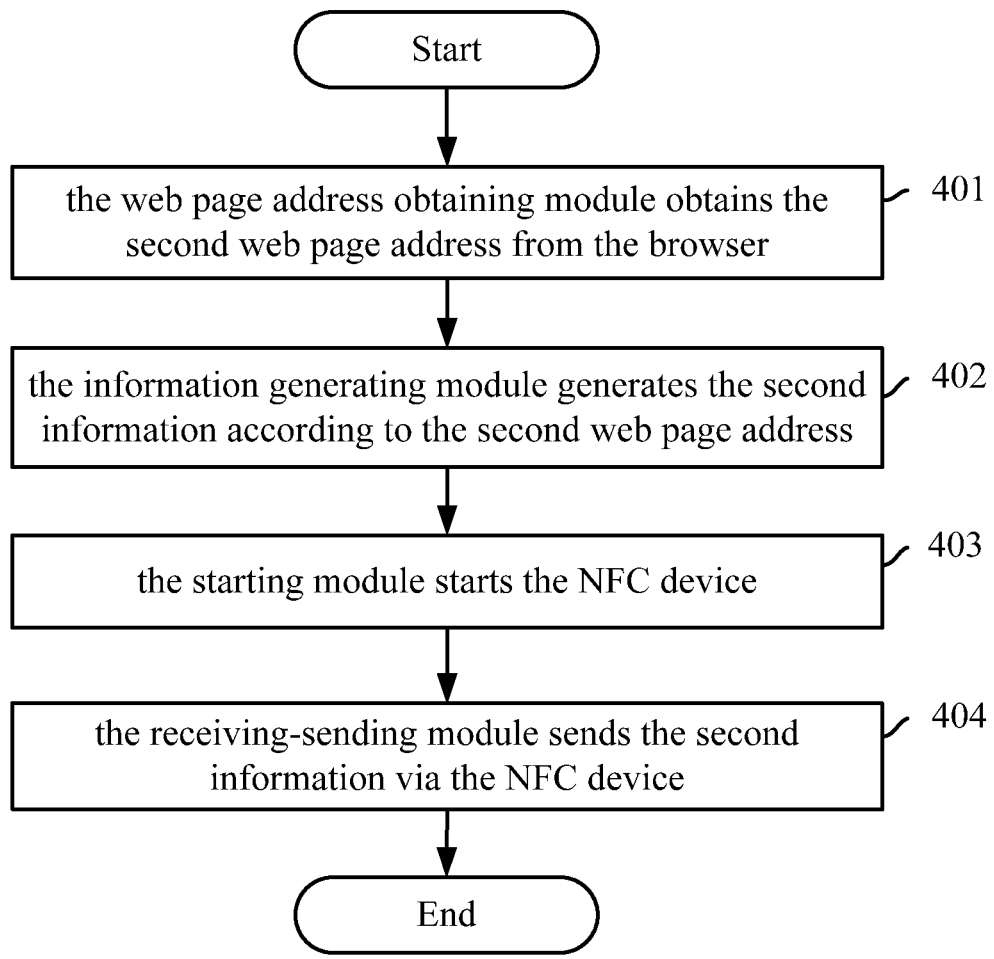
FIG. 4 is a flowchart illustrating a method for sharing information according to various embodiments.

FIG. 4 is a flowchart illustrating a method for sharing information according to various embodiments.

At 401, the web page address obtaining module 1022 obtains the second web page address from the browser 101 of UE 10. The web page address obtaining module 1022 may obtain the web page address by accessing the address bar of the browser 101 and copy the web page address in the address bar.

At 402, the information generating module 1023 generates the second information according to the second web page address when needing to send the second web page address to the second communication object. The second web page address is included in the second information. The second information may include other information, e.g. a title and encryption information corresponding to the second web page address, etc.

At 403, the starting module 1021 starts the NFC device 103 when needing to send the second information to the second communication object. When the NFC device 103 of UE 10 is needed, the NFC device may be in an inactive state. If the NFC device 103 of UE 10 is in the inactive state, the receiving-sending module 1024 cannot send the second web page address to the second communication object via the NFC device 103. Hence, utilizing the starting module 1021 ensures that the NFC device 103 is usable when needing to send the second web page address to the second communication object.

At 404, the receiving-sending module 1024 sends the second information via the NFC device 103 of UE 10 when needing to send the second web page address to the second communication object. After the processing at 404 is performed, the second web page address is shared and the sharing is implemented efficiently. Specifically, the receiving-sending module 1024 sends the second information including the second web page address via the NFC device 103 of UE 10 when needing to send the second web page address to the second communication object.

The second information is received by the second communication object via a NFC object corresponding to the second communication object, and the second web page address is a basis for triggering a browser corresponding to the second communication object to open the web page. According to various embodiments, the web page address is obtained from the browser 101 and is shared with an opposite party via the NFC device 103, thereby simplifying web page sharing operations and sharing the web page efficiently.

In addition, the web page address shared by another person is received via the NFC device 103 of UE 10, and the web page corresponding to the web page address is opened by the browser 101 under the control of the triggering module 1025, thereby simplifying web page sharing operations and sharing the web page efficiently. According to various embodiments, regardless of how long the web page address is, the sharing of the web page address is implemented instantaneously with less risk for error.

The present disclosure avoids the cumbersome processes for sharing information and renders the information sharing more casual and efficient. Further, the user does not need to perform operations step by step to make two devices open in the same web page, but only need to make UE 10 gently touch another device, e.g. the communication object 20, thereby greatly simplifying the operations for sharing information.

The methods and modules described herein may be implemented by hardware, machine-readable instructions or a combination of hardware and machine-readable instructions. Machine-readable instructions used in the embodiments disclosed herein may be stored in storage medium readable by multiple processors, such as hard drive, CD-ROM, DVD, compact disk, floppy disk, magnetic tape drive, RAM, ROM or other proper storage device. Or, at least part of the machine-readable instructions may be substituted by specific-purpose hardware, such as custom integrated circuits, gate array, FPGA, PLD and specific-purpose computers and so on.

A machine-readable storage medium is also provided, which is to store instructions to cause a machine to execute a method as described herein. Specifically, a system or apparatus having a storage medium that stores machine-readable program codes for implementing functions of any of the above embodiments and that may make the system or the apparatus (or CPU or MPU) read and execute the program codes stored in the storage medium.

In this situation, the program codes read from the storage medium may implement any one of the above embodiments, thus, the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM, and so on. Optionally, the program code may be downloaded from a server computer via a communication network.

It should be noted that, alternatively to the program codes being executed by a computer, at least part of the operations performed by the program codes may be implemented by an operation system running in a computer following instructions based on the program codes to realize a technical scheme of any of the above embodiments.

In addition, the program codes implemented from a storage medium are written in storage in an extension board inserted in the computer or in storage in an extension unit connected to the computer. In this embodiment, a CPU in the extension board or the extension unit executes at least part of the operations according to the instructions based on the program codes to realize a technical scheme of any of the above embodiments.

The foregoing is only preferred embodiments of the present invention and is not used to limit the protection scope of the present invention. Any modification, equivalent substitution, and improvement without departing from the spirit and principle of the present invention are within the protection scope of the present invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. An apparatus for sharing information including a memory and a processor communicating with the memory, the memory storing instructions that when executed by the processor cause the processor to:

receive information comprising a web page address from a communication object via a Near Field Communication (NFC) device of a user equipment (UE);

trigger a browser of the UE to open a web page corresponding to the web page address, after the NFC device receives the information, wherein the web page address is obtained by the communication object from a browser corresponding to the communication object, and the information comprising the web page address is sent by the communication object via a NFC device corresponding to the communication object;

obtain a web page address from the browser of the UE; and send information comprising the web page address obtained from the browser of the UE to the communication object via the NFC device of the UE.

2. The apparatus of claim 1, wherein the instructions further cause the processor to:

parse the information and obtain the web page address, after the NFC device receives the information.

3. The apparatus of claim 1, wherein the instructions further cause the processor to:

start the NFC device of the UE, before receiving the information comprising the web page address from the communication object via the NFC device.

4. The apparatus of claim 1, wherein the instructions further cause the processor to:

start the NFC device of the UE, before sending the information to the communication object via the NFC device of the UE.

5. An apparatus for sharing information including a memory and a processor communicating with the memory, the memory storing instructions that when executed by the processor cause the processor to:

obtain a web page address from a browser of a user equipment (UE);

send information comprising the web page address to a communication object via a Near Field Communication (NFC) device of the UE wherein the information is received by the communication object via a NFC device corresponding to the communication object, and the web page address is used by the communication object to trigger a browser corresponding to the communication object to open a web page corresponding to the web page address;

receive information comprising a web page address from the communication object via the NFC device of the UE; and trigger a browser of the UE to open a web page corresponding to the web page address received from the communication object, after the NFC device of the UE receives the information, wherein the web page address is obtained by the communication object from a browser corresponding to the communication object, and the information comprising the web page address is sent by the communication object via a NFC device corresponding to the communication object.

6. The apparatus of claim 5, wherein the instructions further cause the processor to:

start the NFC device, before sending the information to the communication object via the NFC device of the UE.

7. The apparatus of claim 5, wherein the instructions further cause the processor to:

parse the information and obtaining the web page address, after the NFC device receives the information.

8. The apparatus of claim 5, wherein the instructions further cause the processor to:

start the NFC device, before receiving the information comprising the web page address from the communication object via the NFC device.

9. A method for sharing information, comprising:

receiving information comprising a web page address from a communication object via a Near Field Communication (NFC) device of a user equipment (UE);

triggering a browser of the UE to open a web page corresponding to the web page address, after the NFC device receives the information, wherein the web page address is obtained by the communication object from a browser corresponding to the communication object, and the information comprising the web page address is sent by the communication object via a NFC device corresponding to the communication object;

obtaining a web page address from the browser of the UE; and sending information comprising the web page address obtained from the browser of the UE to the communication object via the NFC device of the UE.

10. The method of claim 9, further comprising parsing the information and obtaining the web page address, after the NFC device receives the information.

11. The method of claim 9, further comprising starting the NFC device of the UE, before receiving the information comprising the web page address from the communication object via the NFC device.

12. The method of claim 9, further comprising starting the NFC device of the UE, before sending the information to the communication object via the NFC device of the UE.

* * * * *